United States Patent
Green et al.

(10) Patent No.: US 12,031,642 B2
(45) Date of Patent: Jul. 9, 2024

(54) CHOKE TRIM WITH FLOW TURBULENCE CONTROL

(71) Applicant: Lancaster Flow Automation, LLC, Houston, TX (US)

(72) Inventors: Joshua Green, Houston, TX (US); Gerardo Haro-Valdez, Houston, TX (US); Weston William Woods, Houston, TX (US)

(73) Assignee: Lancaster Flow Automation LLC, Houston, TX (US)

( * ) Notice: Subject to any disclaimer, the term of this patent is extended or adjusted under 35 U.S.C. 154(b) by 0 days.

(21) Appl. No.: 17/478,524

(22) Filed: Sep. 17, 2021

(65) Prior Publication Data

US 2023/0093209 A1     Mar. 23, 2023

(51) Int. Cl.
| | |
|---|---|
| *F16K 47/08* | (2006.01) |
| *E21B 34/06* | (2006.01) |
| *F16K 3/24* | (2006.01) |
| *F16K 39/02* | (2006.01) |
| *F16K 47/14* | (2006.01) |

(52) U.S. Cl.
CPC .............. *F16K 47/08* (2013.01); *E21B 34/06* (2013.01); *F16K 3/24* (2013.01); *F16K 39/02* (2013.01); *F16K 47/14* (2013.01)

(58) Field of Classification Search
CPC . F16K 47/08; F16K 3/24; F16K 47/14; F16K 39/02; E21B 34/06
See application file for complete search history.

(56) References Cited

U.S. PATENT DOCUMENTS

| | | | | |
|---|---|---|---|---|
| 43,949 | A | * | 8/1864 | Miller ..................... F16K 47/08 137/625.37 |
| 3,791,413 | A | * | 2/1974 | Muller ..................... F16K 47/04 137/625.34 |
| 4,540,022 | A | * | 9/1985 | Cove ........................ F16K 47/08 251/210 |
| 5,086,808 | A | * | 2/1992 | Pettus ..................... E21B 34/02 251/282 |
| 5,706,856 | A | * | 1/1998 | Lancaster ............... F16K 47/08 251/282 |

(Continued)

*Primary Examiner* — Craig M Schneider
*Assistant Examiner* — Christopher D Ballman
(74) *Attorney, Agent, or Firm* — Phillip Black; Dossay & Janes PLLC

(57) ABSTRACT

A choke valve including a valve body defining an inlet defining a centrally disposed axis extending through the inlet, an outlet, and a chamber in fluidic communication with the inlet and the outlet, and a flow trim disposed within the chamber and having a side wall that defines a generally cylindrical shape, the flow trim defining a passage through the flow trim, a pair of diametrically opposing windows extending through the side wall, each window permitting fluid communication between the chamber and the passage in a direction orthogonal to the centrally disposed axis defined by the inlet, and a slot extending through the side wall, the slot being disposed substantially equidistantly between the pair of diametrically opposing windows orthogonal to the centrally disposed axis defined by the inlet and on a side of the flow trim opposite the inlet, the slot permitting containment of turbulence created by interaction of fluid flow through the windows.

17 Claims, 8 Drawing Sheets

(56) References Cited

U.S. PATENT DOCUMENTS

| | | | | |
|---|---|---|---|---|
| 5,979,558 | A * | 11/1999 | Bouldin | E21B 43/12 |
| | | | | 166/334.4 |
| 6,105,614 | A * | 8/2000 | Bohaychuk | F16K 47/08 |
| | | | | 251/118 |
| 6,283,152 | B1 * | 9/2001 | Corte, Jr. | F16K 39/022 |
| | | | | 251/282 |
| 6,782,949 | B2 * | 8/2004 | Cove | E21B 33/035 |
| | | | | 166/368 |
| 7,426,938 | B2 * | 9/2008 | Bohaychuk | F16K 3/24 |
| | | | | 137/625.33 |
| 8,490,652 | B2 * | 7/2013 | Bohaychuk | F16K 3/24 |
| | | | | 137/625.33 |
| 9,046,191 | B2 * | 6/2015 | Davies | F16K 47/00 |
| 9,951,877 | B2 * | 4/2018 | Grace | F16K 47/08 |
| 10,007,273 | B2 * | 6/2018 | Martino | G05D 7/0635 |
| 10,215,306 | B2 * | 2/2019 | Braeuer | F16K 47/08 |
| 10,907,443 | B2 * | 2/2021 | Allen | F16K 3/246 |
| 10,989,328 | B2 * | 4/2021 | Giove | F16K 3/246 |
| 2002/0017327 | A1 * | 2/2002 | Kawaai | F16K 3/34 |
| | | | | 137/625.3 |
| 2013/0193356 | A1 * | 8/2013 | Collison | F16K 31/508 |
| | | | | 251/89 |

* cited by examiner

CHOKE TRIM WITH FLOW TURBULENCE CONTROL

TECHNICAL FIELD

The present embodiment generally relates to a valve apparatus for controlling flow of fluids which are liquid or gas or mixtures with or without particulate, and more particularly to a choke trim with flow turbulence control to reduce erosion on the choke trim.

BACKGROUND

A choke valve is used in oil and gas wellhead applications to control the flow of hydrocarbons through the wellhead. The choke valve may include a stem that raises and/or lowers through a bore defined in the valve body of the choke valve. The relative position of the choke valve stem through the bore effects opening or closing of flow passages, thereby permitting or obstructing fluid flow therethrough.

Choke valves are subjected to extreme conditions that can cause erosion and other damage to the components of the wellhead. Erosion and other damage of the valve components is caused by particulates within the fluid that are moving at a high velocity under pressure through the wellhead. Due to the extreme conditions under which the wellhead operates, erosion resistant or extremely hard materials are often selected to form the components that are subjected to the most stresses. Such materials may include, for example, tungsten alloys that are very hard such that the effects of erosion on the valve trim are minimized, mitigated, or delayed. Generally, tungsten has a Mohs hardness of 7.5 and tungsten carbide has a Mohs hardness of 8.5-9, whereas hardened steel has a Mohs hardness of 7-8. In contrast, softer materials may not be ideal for extreme applications as they would wear relatively more quickly. For example, copper only has a Mohs hardness of 2.5-3.5 and aluminum only has a Mohs hardness of 2-2.9. It is noted that diamond has a Mohs hardness of 10, whereas 18 ct gold has a Mohs hardness of only 3 on the Mohs hardness scale.

Since harder materials will wear less quickly, the use of hard materials like tungsten carbide may be desirable, but they are relatively expensive. Also, while hard materials may be effective against erosion over time, hard materials may be susceptible to fracture due to impact from foreign debris within the fluid flowing through valve. Thus, while it may be preferable if the materials that are used are erosion resistant, it is also preferable if the flow paths are such that the odds of an impact fracture with valve components, such as the valve trim, are minimized or at least mitigated and if the flow rate or velocities along the interior walls of the flow passages of the valve were reduced.

It should be understood that the foregoing description is provided to aid in understanding the present disclosure and should not be construed as any admission of prior art without an explicit statement to that effect.

SUMMARY

In an embodiment of the present disclosure, a choke valve may include a valve body and a flow trim. The valve body may define: an inlet defining a centrally disposed axis extending through the inlet; an outlet; and a chamber in fluidic communication with the inlet and the outlet. The choke valve may further include a flow trim that may be disposed within the chamber and that may have a side wall that defines a generally cylindrical shape. The flow trim may define: a passage that extends through the flow trim; a pair of diametrically opposing windows extending through the side wall, each window permitting fluid communication between the chamber and the passage in a direction orthogonal to the centrally disposed axis defined by the inlet; and a slot extending through the side wall, the slot being disposed substantially equidistantly between the pair of diametrically opposing windows orthogonal to the centrally disposed axis defined by the inlet and on a side of the flow trim opposite the inlet, the slot permitting containment of turbulence created by interaction of fluid flow through the windows.

In a further embodiment, a method for choking flow from a hydrocarbon fluid feed, may include introducing a hydrocarbon fluid flow under pressure into a chamber defined by a valve body assembly, the hydrocarbon fluid flow including entrained particulates and the valve body assembly including: an inlet defining a first centrally disposed axis extending through the inlet; an outlet; a chamber in fluidic communication with the inlet and the outlet, the chamber; and a cylindrically-shaped flow trim disposed within the chamber and having a side wall defining a generally cylindrical shape, the flow trim defining a second centrally disposed axis extending therethrough, the second centrally disposed axis being generally orthogonal to the first centrally disposed axis, the cylindrically-shaped flow trim defining a circumference defining: a first quadrant proximal to the inlet; a second quadrant diametrically opposing the first quadrant; a third quadrant between the first quadrant and the second quadrant; and a fourth quadrant diametrically opposing the third quadrant; and flowing the hydrocarbon fluid flow through the inlet in a direction toward the flow trim.

These and other aspects of the present disclosure are more fully described herein with reference to the accompanying figures.

BRIEF DESCRIPTION OF THE DRAWINGS

The detailed description will be better understood in conjunction with the accompanying drawings as follows.

Figure 1:
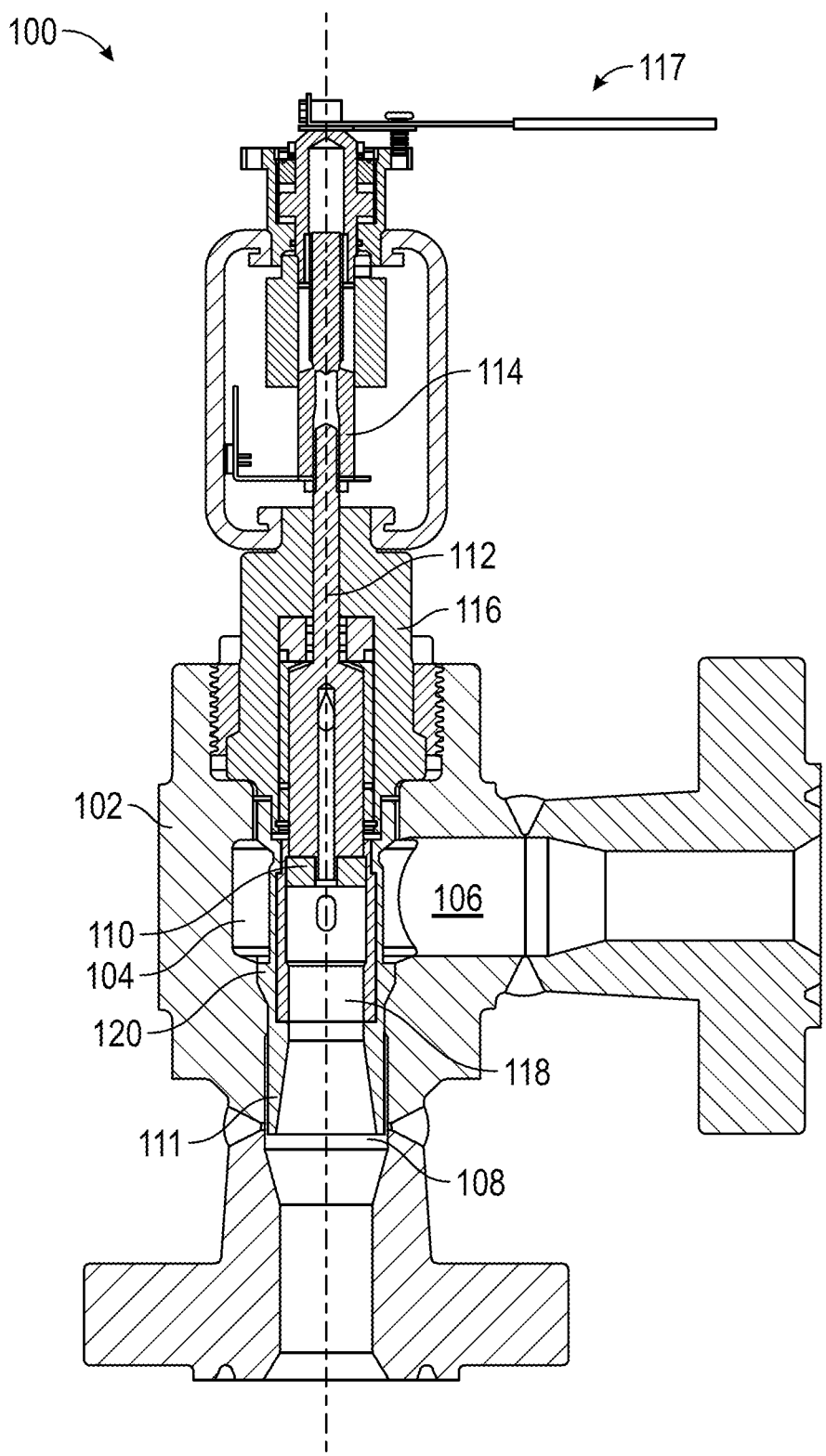
FIG. 1 is a cross-sectional view of a valve apparatus in accordance with one or more embodiments of the present disclosure.

The present embodiments are detailed below with reference to the listed figures.

DETAILED DESCRIPTION OF THE EMBODIMENTS

Reference will now be made in detail to embodiments of the invention. Wherever possible, same or similar reference numerals are used in the drawings and the description to refer to the same or like parts or steps. The drawings are in simplified form and are not to precise scale. In order not to obscuring the present disclosure in unnecessary detail, various components that are not germane to an understanding of the inventive subject matter have been omitted.

With reference to FIG. 1, a valve apparatus 100 will now be described. An example of a valve apparatus is shown in U.S. Pat. Pub. No. 2020/0088306, which is co-assigned to the present applicant and the contents of which are fully incorporated herein by reference.

The valve apparatus 100 includes a valve body 102 including a valve chamber 104 having an inlet port 106 and an outlet port 108. A control member 110 may be axially movable with respect to a flow trim assembly 111 between a closed position that prevents the flow of fluid and an open position that permits the flow of fluid between the inlet port 106 and the outlet port 108. A lower stem 112 be secured at one end to an upper stem and may extend through a bore of a valve bonnet 116. The valve stem 112 may be operatively coupled to the control member 110 to effect axial movement of the control member 110 between its open and closed positions. An operating means 117 may be operatively coupled to the upper stem 114 such that actuation of the operating means 117 effects transitioning of the control member 110 between its open and closed positions.

When the control member 110 is in an open position, pressured fluid will flow through the valve chamber 104 from the inlet port 106 toward the outlet port 108. As will be discussed in greater detail below, a flow trim 118 that is disposed within the valve chamber 104 is configured to impart desired flow characteristics by directing the flow therethrough in a manner that will inhibit erosion, wear, and/or damage of hardware. The flow trim 118 may be coupled to an outer seat carrier 120. Together, the flow trim 118 and the outer seat carrier 120 may form a flow trim assembly 111.

Figure 2A:
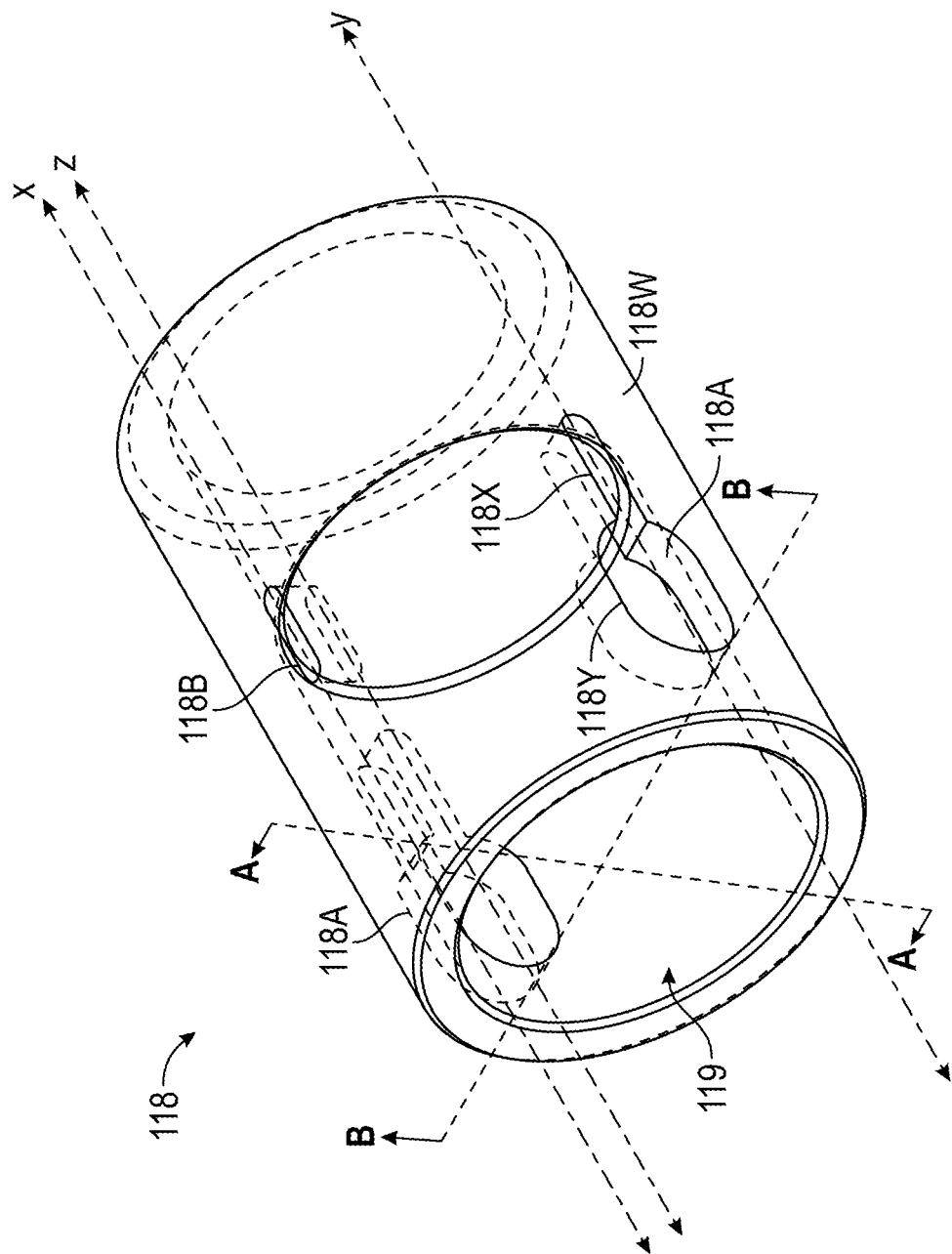
FIG. 2A is a perspective view of a flow trim in accordance with one or more embodiments of the present disclosure.

As shown in FIG. 2A, the flow trim 118 may define a through hole 119 longitudinally extending therethrough. The flow trim 118 may have a generally cylindrical shape and may include a pair of diametrically opposing windows 118A extending through a wall 118W of the flow trim 118 and a slot 118B may extend through the wall 118W at a position between the windows 118A. As shown in FIG. 2A, the windows 118A may have a generally keyhole shape including a first section having a first configuration and size and a second section having a second configuration and size. The width of the two sections may be generally constant, although the edges of the windows 118A may be rounded or chamfered such that stress concentrations may be minimized. As the control member 110 is moved toward the open position, the windows 118A may be incrementally opened. Preferably, the narrower section of the windows 118A may be opened first such that the opening of the windows 118A is opened in relatively small increments, and then the larger sized sections of the windows 118A may then be opened in relatively larger increments permitting an increasing amount of fluid flow. During closing of the valve apparatus 100, the larger size sections of the windows 118A may be incrementally closed prior to incrementally closing the smaller size sections of the windows 118A. Advantageously, as discussed herein, the slot 118B improves the flow characteristics such that wear on the flow trim 118 is minimized during use.

In FIG. 2A, longitudinal axes x and y are shown extending through the lengths of respective ones of the window 118A and a longitudinal axis z is shown extending through the slot 118B. The polar angle between the x and z axes may be equal to the polar angle between the y and z axes such that the polar angle between the x and z axes and the polar angle between the y and z axes are equal to $\pi/2$ radians.

The windows 118A may generally define a keyhole shape having a first section 118X and a second section 118Y. The first section 118X may define a generally elliptical shape having a first width and the second section 118Y may define a generally elliptical shape having a second width, the second width being wider than the first width. This keyhole shape helps provide flow control as the control member 110 within the bore defined by the flow trim to cause there to be a larger or smaller orifice for fluid flow therethrough.

Figure 2B:
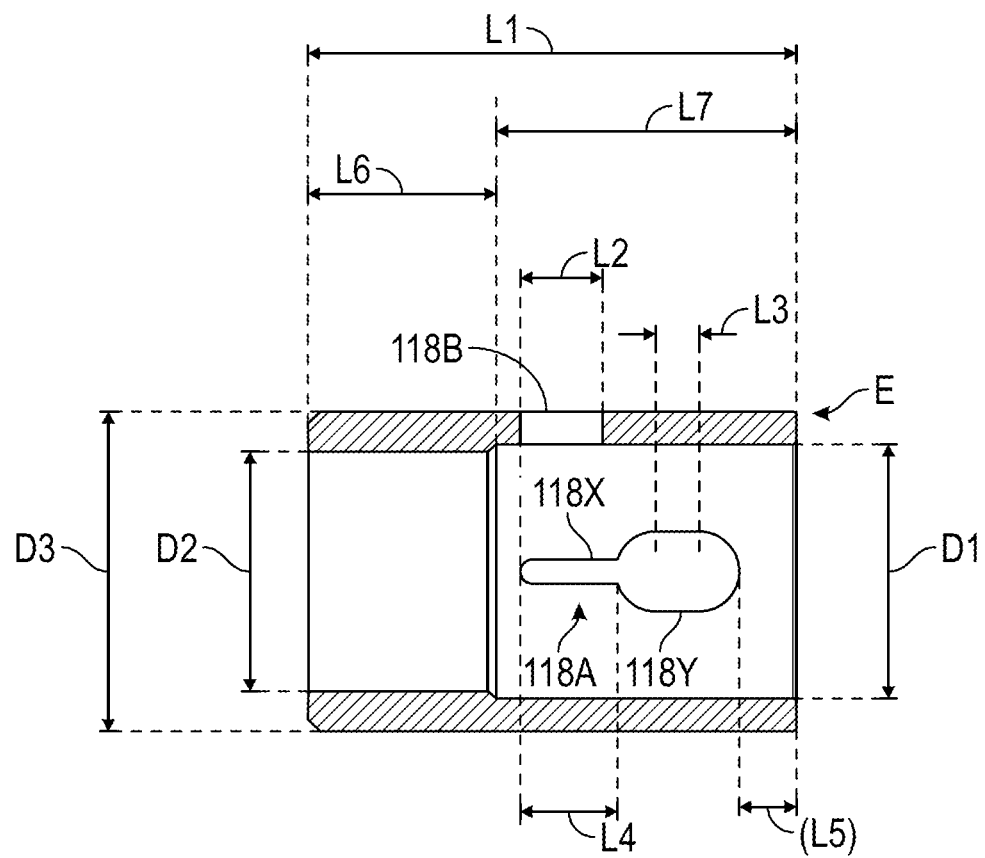
FIG. 2B is a cross-sectional view of the flow trim of FIG. 2A taken along section-line A:A.
Figure 2C:
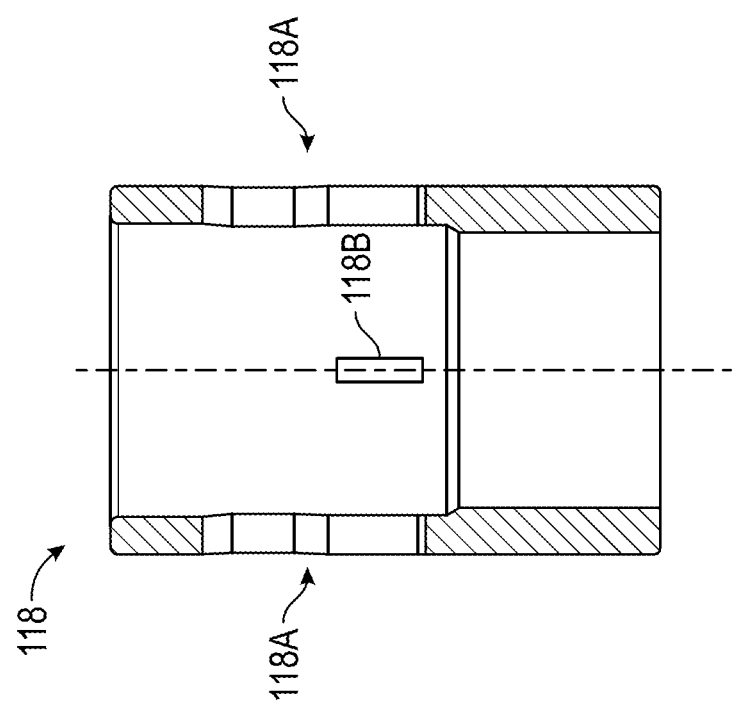
FIG. 2C is a cross-sectional view of the flow trim of FIG. 2A taken along section-line B:B.

FIG. 2B illustrates cross-sectional view of the flow trim of FIG. 2A taken along section-line A:A. FIG. 2C illustrates a cross-sectional view of the flow trim of FIG. 2A taken along section-line B:B.

As shown in FIG. 2B, the flow trim 118 may have an overall length L1, which may be, for example, 3.750 inches (9.398 cm). The slot 118B may define a length L2, which may be, for example, 0.630 inches (1.6002 cm). The first section 118X may define a shape that includes a semi-circle and a rectangular section. The second section 118Y of the window 118A may define an elliptical shape that has foci that are spaced apart from one another by a length L3, which may be, for example, 0.322 inches (0.81788 cm). The elliptical shape may approximate the shape of an ellipse and may be formed by a rectangular shape and semi-circular shapes on opposing sides of the rectangular shape, as shown in FIG. 2B.

The first section 118X of the window 118A may have a length L4 that is 0.754 inches (1.91516 cm). The window 118A may be spaced from a first end E of the flow trim 118 by a length L5 that may be, for example, 0.439 inches (1.11506 cm). The flow trim 118 may include a first section that extends a length L6, that may be 1.444 inches (3.66776 cm), and a second section that extends a length L7, which may be 2.306 inches (5.85724 cm). Along the length L7, the flow trim may define an inner diameter D1, which may be 2.000 inches (5.08 cm) and along the length L6, the flow trim 118 may define an inner diameter D2, which may be 1.876 inches (4.76504 cm). The exterior diameter D3 of the low trim may be generally uniform and may be 2.500 inches (6.35 cm).

Figure 3:
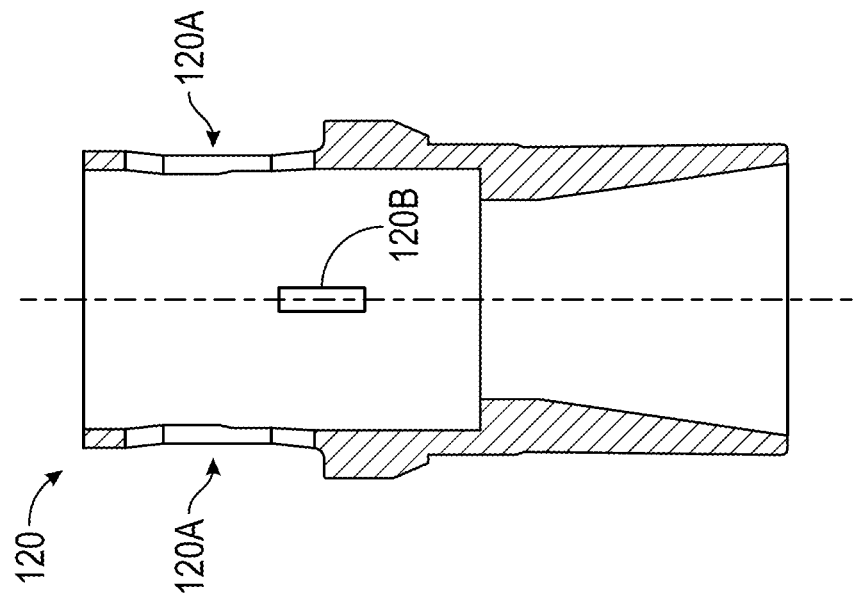
FIG. 3 is a cross-sectional view of an outer seat carrier.

FIG. 3 illustrates a cross-sectional view of the outer seat carrier 120 in which the flow trim 118 may be disposed. As already discussed with reference to FIG. 1 illustrating the valve apparatus 100, when coupled together, the flow trim 118 and the outer seat carrier 120 may form the flow trim assembly 111. The flow trim 118 may generally approximate the interior dimension of the outer seat carrier 120. The outer seat carrier 120 may include apertures 120A which may be generally cylindrical to provide access to the windows 118A and may also include an aperture 120B to provide access to the slot 118B. When the flow trim 118 is disposed within the outer seat carrier 120, the apertures 120A may be aligned with the windows 118A and the aperture 120B may be aligned with the slot 118B.

The flow characteristics and path of fluid through the choke valve assembly 100 as created by the flow trim 118 is described with reference to FIGS. 4-6.

Figure 4:
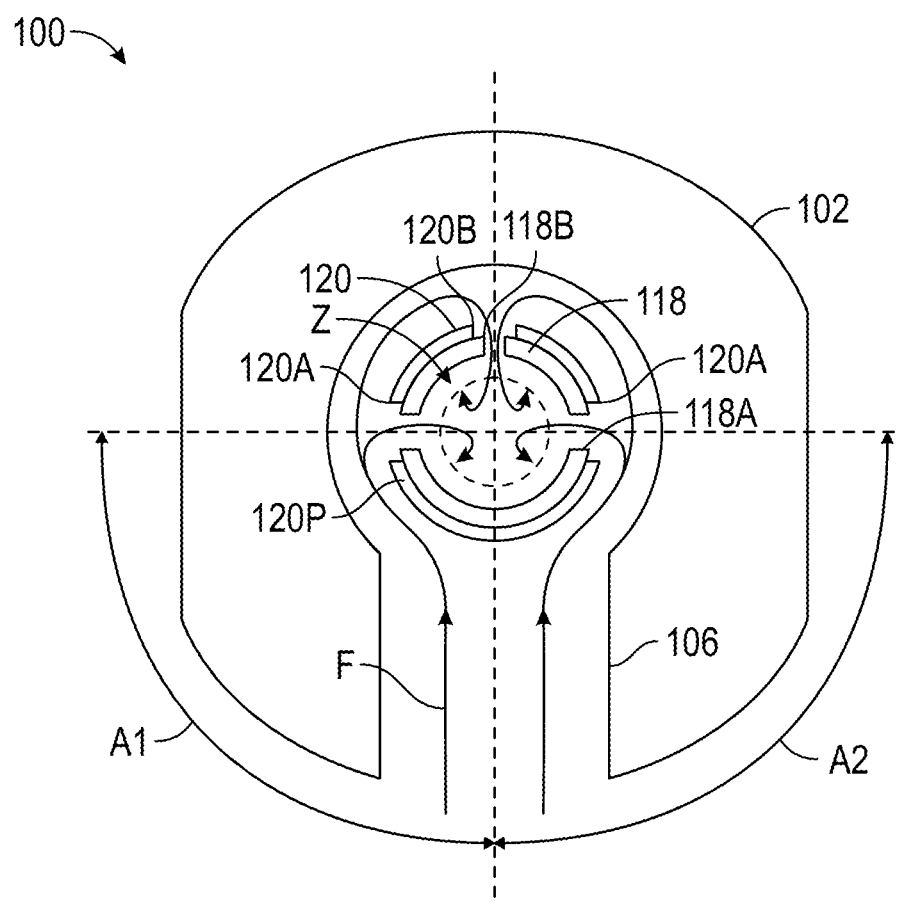
FIG. 4 depicts a flow path of fluid through the valve apparatus of FIG. 1 as created by the flow trim of FIG. 2A in accordance with one or more embodiments of the present disclosure.

As shown in FIG. 4, the flow trim 118 is disposed in the hollow valve body 102. The flow trim 118 is shown as being engaged with the outer seat carrier 120 and the two are mated within the valve body 100 such that the diametrically opposing windows 118A of the flow trim 118 are aligned with the apertures 120A of the outer seat carrier 120 and the slot 118B and the aperture 120B are also aligned. As shown in FIG. 4, the flow trim 118 has two elongated longitudinally disposed windows 118A, each of which is oriented at a 90-degree angle A1 and A2 to the body inlet 106 enabling inlet fluid F to flow around a proximal end 120P of the outer seat carrier 120. In FIG. 4, the flow of the inlet fluid F is represented by directional arrows as being split into two fluid flows and entering into a centrally disposed region or flow impinging zone Z as indicated by the phantom lines within the flow trim 118.

The act of passing through the openings of the windows 118A and slot 118B of the flow trim 118 is responsible for the desired fluid flow rate drop and pressure drop as the fluid passes through the windows 118A and the slot 118B. Within the flow impinging zone Z, the flow F impinges upon itself. Because the windows 118A are placed 180° apart (i.e., diametrically apart), they cause the flow to be directed together and the placement of the slot 118B therebetween results in a reduction of fluid viscosity at the inner walls of the flow trim 118, thereby resulting in markedly improved wear life. In contrast, without the slot 118B, the resulting impinged flow would be more turbulent and would result in greater erosion in the interior of the trim. Advantageously, in contrast, the flow through the slot 118B impinges together with the two impinging flows from the diametrically opposing windows 118A. The third impinging flow through the slot 118B reduces the turbulence within the cylindrical trim chamber and thus reduces erosion on the interior of the trim.

Figure 5:
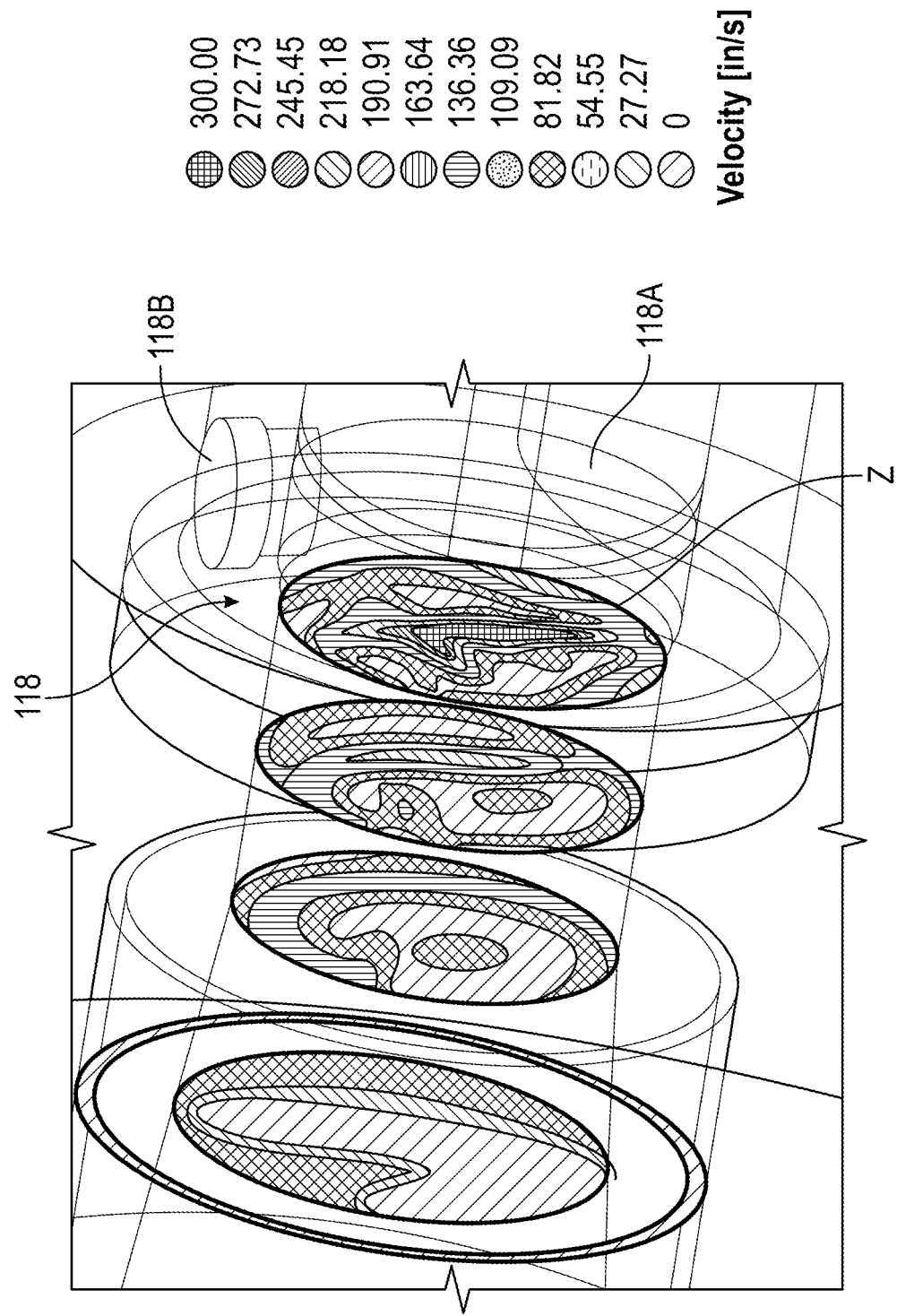
FIGS. 5-6 is a diagram of flow through a valve apparatus of FIG. 1 illustrating flow velocity.

FIG. 5 depicts the velocity distribution of fluid flowing through the flow trim 118 in which regions flowing at different velocities are shaded with different hatch-patterns. As can be seen in FIG. 5, the highest velocity region is in the flow impinging zone Z, which was described above with reference to FIG. 4 the area in which fluid flowing from the windows 118A and the slot 118B impinge upon one another. Advantageously, as a consequence of the fluid flows from the windows 118A and the slot 118B impinging on one another in the centrally disposed region of the flow impinging zone Z, the fluid velocity is much lower than it would be otherwise. Advantageously, the highest rate of fluid flow is centralized within the flow trim 118 and away from the interior wall or surface of the flow trim 118, thereby minimizing wear on the flow trim 118.

Figure 6:
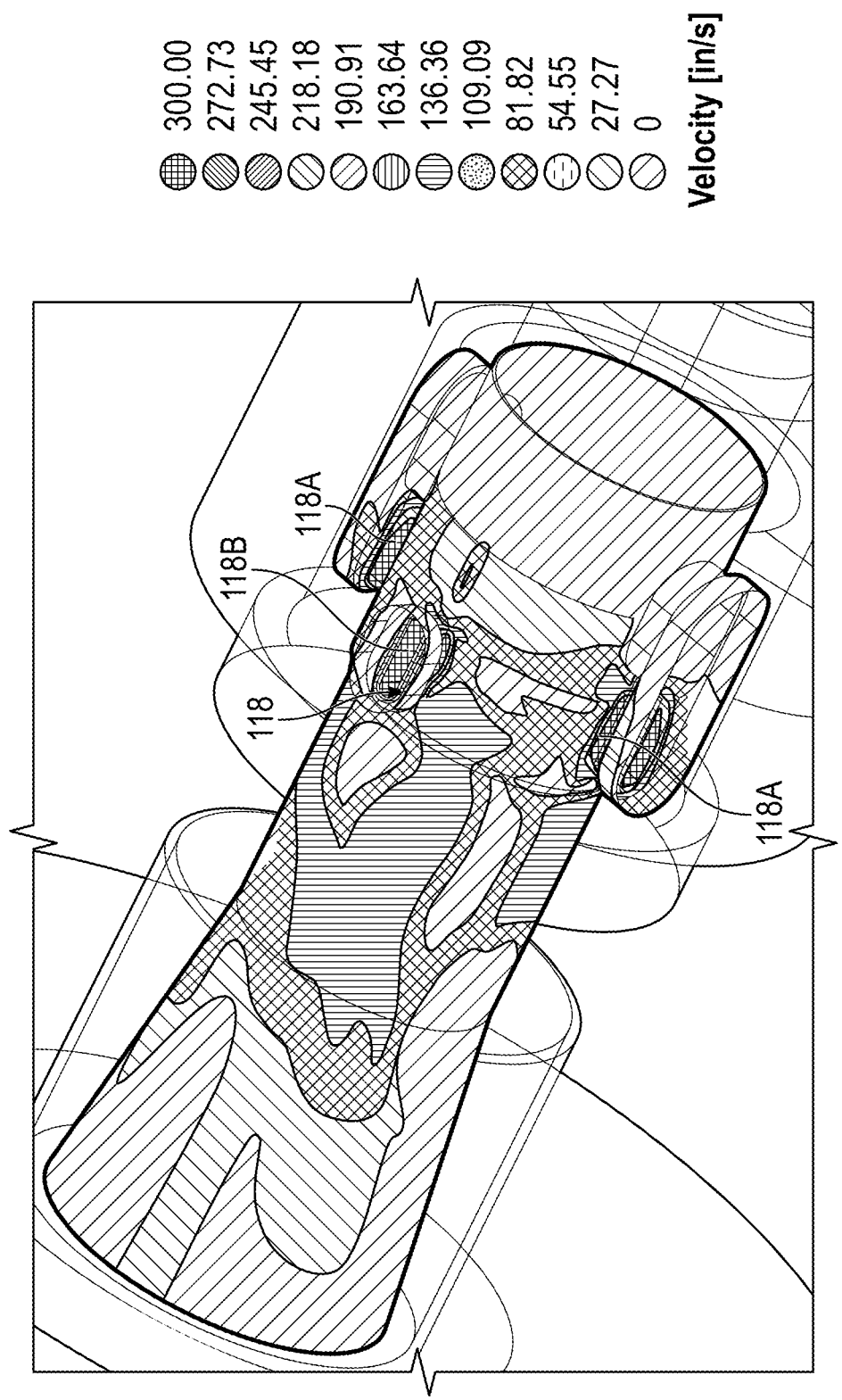
Figure 7:
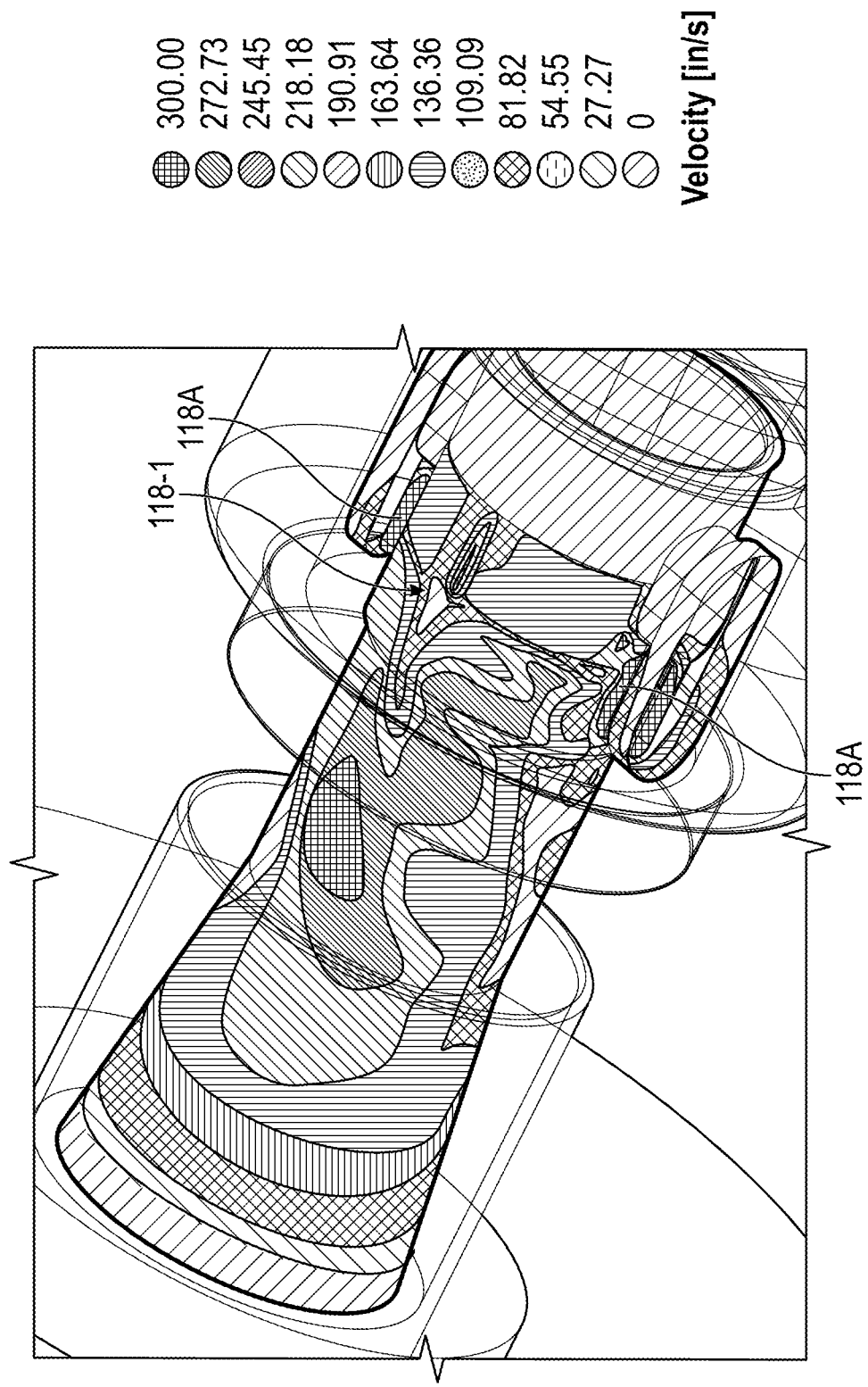
FIG. 7 is a diagram of flow through a valve apparatus accordance to another embodiment of the present disclosure illustrating flow velocity.

As shown in FIG. 6, which depicts the fluid flow at the interior wall of the flow trim 118, most of the fluid is not flowing tangentially to interior wall and/or is moving at a relatively low or nearly zero rate. As would be expected, at the windows 118A and the slot 118B, the fluid rate is relatively high, but this fluid flows toward the flow impinging zone Z (FIGS. 4-5) and causing the fluid flowing near or tangentially to the interior wall of the flow trim to have a relatively low rate of flow. FIG. 7 depicts an alternate flow trim 118-1 which is substantially similar to the flow trim 118 except that it does not include the slot 118B, is shown having a fluid flowing therethrough and the flow rates at the interior surface of the show trim 118-1. As compared to the flow trim 118 in which the fluid flow is directed to the flow impinging zone Z, the interior wall or surface of the flow trim 118-1 has flow rates near or tangential to the interior wall or surface of the flow trim 118-1 that is far greater than that of the flow trim 118. Consequently, it can be expected that the wear life of the flow trim 118 will be greater than that of the flow trim 118 because the flow trim 118-1 is subjected to fluid flowing at a greater rate against its surfaces than that of the fluid flowing through the flow trim 118 in which the fluid impinges upon itself rather than upon the surfaces of the trim.

Having described at least one of the preferred embodiments of the present invention with reference to the accompanying drawings, it will be apparent to one of ordinary skill in the art that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A choke valve, comprising:
 a valve body defining:
  an inlet defining a centrally disposed axis extending through the inlet;
  an outlet; and
  a chamber in fluidic communication with the inlet and the outlet; and
 a flow trim disposed within the chamber and having a side wall that defines a generally cylindrical shape, the flow trim defining:
  a passage through the flow trim;
  a pair of diametrically opposing windows extending through the side wall, each window permitting fluid communication between the chamber and the passage in a direction orthogonal to the centrally disposed axis defined by the inlet; and
  a slot extending through the side wall, the slot being disposed orthogonal to the pair of diametrically opposing windows, the pair of diametrically opposing windows orthogonal to the centrally disposed axis defined by the inlet and on a side of the flow trim opposite the inlet, the slot permitting containment of turbulence created by interaction of fluid flow through the diametrically opposing windows,
  wherein each of the pair of diametrically opposing windows defines a keyhole shape defining a first section and a second section, the first section having a first width, the second section having a second width, the first width being narrower than the second width,
  wherein the slot comprises a slot width,
  wherein the slot width is smaller than the first widths of each of the pair of diametrically opposing windows,
  wherein the slot is positioned circumferentially longitudinal to each of the first sections of each of the pair of diametrically opposing windows.

2. The choke valve according to claim 1, wherein:
 each of the pair of diametrically opposing windows defines a first area; and
 the slot defines a second area, the second area being larger than the first area.

3. The choke valve according to claim 1, further comprising:
 a control member that is axially movable to effect an opening of the diametrically opposing windows in response to axial movement of the control member in a first direction and a closing of the diametrically opposing windows in response to axial movement of the control member in a second direction, the second direction being opposite that of the first direction.

4. The choke valve of claim 1, wherein:
 the slot comprises a perimeter smaller than a perimeter of the first section of a respective one of the pair of diametrically opposing windows and smaller than a perimeter of the first section of a respective other of the pair of diametrically opposing windows.

5. The choke valve of claim 1, wherein:
the flow trim is disposed in an outer seat carrier including an aperture aligned with the slot, further wherein a perimeter of the aperture and a perimeter of the slot are substantially similar.

6. A method for choking flow from a hydrocarbon fluid feed, comprising:
introducing a hydrocarbon fluid flow under pressure into a chamber defined by a valve body assembly, the hydrocarbon fluid flow including entrained particulates and the valve body assembly including:
an inlet defining a first centrally disposed axis extending through the inlet;
an outlet, the chamber being in fluidic communication with the inlet and the outlet; and
a cylindrically-shaped flow trim disposed within the chamber and having a side wall defining a generally cylindrical shape, the flow trim defining a second centrally disposed axis extending therethrough, the second centrally disposed axis being generally orthogonal to the first centrally disposed axis, the cylindrically-shaped flow trim defining a circumference defining:
a first quadrant proximal to the inlet;
a second quadrant diametrically opposing the first quadrant;
a third quadrant between the first quadrant and the second quadrant; and
a fourth quadrant diametrically opposing the third quadrant; and
flowing the hydrocarbon fluid flow through the inlet in a direction toward the flow trim;
wherein the cylindrically-shaped flow trim further comprises:
a first window defined in the third quadrant;
a second window defined in the fourth quadrant; and
a third window defined in the second quadrant, the third window orthogonal to the first window and the second window,
wherein the first window and the second window are equal in size and configuration,
wherein the third window is smaller than the first window and the second window,
wherein each of the first window and the second window defines a keyhole shape,
wherein each of the first window and the second window defines a first section and
a second section, the first section being smaller than the second section,
wherein the third window comprises a perimeter smaller than a perimeter of the first section of the first window and smaller than a perimeter of the first section of the second window,
wherein the third window is positioned circumferentially longitudinal to each of the first sections of the first window and the second window.

7. The method of claim 6, further comprising:
effecting opening of the valve body assembly by incrementally opening the first and second windows, wherein during opening of the valve body assembly the first section is opened prior to opening the second section.

8. A method for choking flow from a hydrocarbon fluid feed comprising:
introducing hydrocarbon fluid flow in a first direction under pressure through an inlet and into a chamber, the chamber and inlet defined by a valve body and the hydrocarbon fluid flow including entrained particulates;
diverting the hydrocarbon fluid flow around a flow trim disposed in the chamber, the flow trim defining a passage therethrough and a pair of diametrically opposing windows and a slot permitting fluid communication between the chamber and the passage;
flowing the hydrocarbon fluid flow into the passage through the diametrically opposing windows from a second direction and a third direction, the second direction and the third direction being orthogonal to the first direction and opposite one another; and
flowing the hydrocarbon fluid flow into the passage through the slot from a fourth direction at a point on the flow trim opposite from the inlet, the fourth direction being coincident with and opposite to the first direction, to contain a turbulence in the hydrocarbon fluid flow caused by an interaction of the fluid flow in the passage from the hydrocarbon fluid flow in the second direction and the hydrocarbon fluid flow in the third direction and to inhibit erosion of the flow trim,
wherein each of the pair of diametrically opposing windows defines a keyhole shape,
wherein each of the pair of diametrically opposing windows defines a first section and a second section, the first section being smaller than the second section,
wherein the slot comprises a perimeter smaller than a perimeter of the first sections of each of the pair of diametrically opposing windows,
wherein the slot is positioned circumferentially longitudinal to each of the first sections of each of the pair of diametrically opposing windows.

9. The method of claim 6, wherein:
the flow trim is disposed in an outer seat carrier including an aperture aligned with the third window, further wherein a perimeter of the aperture and a perimeter of the third window are substantially similar.

10. The method of claim 8, wherein the plurality of windows includes:
a first window and a second window, each of the first window and second window oriented in a second direction orthogonal to the first direction and disposed on opposite sides of the flow trim; and
a slot oriented in the first direction and disposed on a side of the flow trim opposite the inlet to the chamber.

11. The method of claim 10, further comprising:
effecting opening of the valve body assembly by incrementally opening the first window and second window, wherein during opening of the valve body assembly, the first section of the first window and the first section of the second window are opened prior to opening the second section of the first window and the second section of the second window.

12. The method of claim 11, wherein:
during opening of the first section of the first window and the first section of the second window effects an incremental increase of flow by a first increment.

13. The method of claim 12, wherein:
during opening of the second section of the first window and the second section of the second window effects an incremental increase of flow by a second increment, the second increment being greater than the first increment.

14. The method of claim 10, wherein:
at least a portion of the hydrocarbon fluid flow moves through the slot when effecting the opening of the trim assembly.

15. The method of claim 10, further comprising:
effecting closing of the trim assembly commences by incrementally closing the second sections of the first and second windows and then incrementally closing the first sections of the first and second windows.

16. The method of claim 10, wherein:
the slot comprises a perimeter smaller than a perimeter of the first section of the first window and smaller than a perimeter of the first section of the second window.

17. The method of claim 10, wherein:
the flow trim is disposed in an outer seat carrier including an aperture aligned with the slot, further wherein a perimeter of the aperture and a perimeter of the slot are substantially similar.

* * * * *